United States Patent
Lindsley et al.

(10) Patent No.: US 10,271,261 B1
(45) Date of Patent: *Apr. 23, 2019

(54) PRIORITIZED TRANSMISSION OF DIFFERENT DATA TYPES OVER BONDED COMMUNICATION CHANNELS

(71) Applicant: Olaeris, Inc., Fort Worth, TX (US)

(72) Inventors: Edward Lindsley, Burelson, TX (US); Michael B. Dodd, Salt Lake City, UT (US)

(73) Assignee: Sqwaq, Inc., Plano, TX (US)

( * ) Notice: Subject to any disclaimer, the term of this patent is extended or adjusted under 35 U.S.C. 154(b) by 133 days.

This patent is subject to a terminal disclaimer.

(21) Appl. No.: 15/494,441

(22) Filed: Apr. 21, 2017

Related U.S. Application Data

(63) Continuation-in-part of application No. 14/671,009, filed on Mar. 27, 2015, now Pat. No. 9,801,201.

(60) Provisional application No. 62/327,399, filed on Apr. 25, 2016, provisional application No. 61/976,045, filed on Apr. 7, 2014.

(51) Int. Cl.
| | |
|---|---|
| *G05D 1/00* | (2006.01) |
| *B64C 39/02* | (2006.01) |
| *H04W 40/14* | (2009.01) |
| *H04W 72/10* | (2009.01) |

(52) U.S. Cl.
CPC ........... *H04W 40/14* (2013.01); *B64C 39/024* (2013.01); *G05D 1/0022* (2013.01); *H04W 72/10* (2013.01); *B64C 2201/146* (2013.01)

(58) Field of Classification Search
CPC .... H04W 40/14; H04W 72/10; B64C 39/024; B64C 39/028; B64C 39/10; G05D 1/002
See application file for complete search history.

(56) References Cited

U.S. PATENT DOCUMENTS

| | | | |
|---|---|---|---|
| 8,155,158 B2 | 4/2012 | Saavedra | |
| 8,717,885 B2 | 5/2014 | Arisoylu et al. | |
| 9,201,835 B2 * | 12/2015 | Akin | G06F 15/16 |

(Continued)

OTHER PUBLICATIONS

"Ocean Vessel WiFi—VSAT and Cellular Bonding", Wei Ming, Apr. 2, 2014, 2 pages. https://forum.peplink.com/t/ocean-vessel-wi-fi-vsat-and-cellular-bonding/2532.

(Continued)

*Primary Examiner* — Afsar M Qureshi

(74) *Attorney, Agent, or Firm* — Michael B. Dodd; Dodd Law Group

(57) ABSTRACT

The present invention extends to methods, systems, devices, apparatus, and computer program products for prioritized transmission of different data types, including VHF airband radio communication data (e.g., being transmitted or received from a control tower) over bonded communication modules at a remotely operated aerial vehicle. Embodiments of the invention include portable (and potentially mobile and/or remotely operated) vehicles for wirelessly transmitting and receiving various data types over a bonded mobile network and a control device (which can be fixed or portable) capable of receiving data transmitted from the mobile node and transmitting data to it. Different data types can be assigned different priorities, facilitating selective transmission of higher-priority data, such as, for example, VHF airband radio communication data, when quality degrades on a network link.

20 Claims, 4 Drawing Sheets

(56) References Cited

U.S. PATENT DOCUMENTS

| | | | |
|---|---|---|---|
| 9,313,667 | B1 | 4/2016 | Daoura |
| 9,651,944 | B2 | 5/2017 | Arwine |
| 9,688,401 | B2 | 6/2017 | Hester et al. |
| 9,801,201 | B1 * | 10/2017 | De Nagy Koves Hrabar ............ H04W 40/04 |
| 2003/0035371 | A1 | 2/2003 | Reed et al. |
| 2004/0225440 | A1 * | 11/2004 | Khatwa ................... G01S 19/15 701/301 |
| 2005/0251579 | A1 * | 11/2005 | Ngo ....................... G07O 5/008 709/234 |
| 2006/0149851 | A1 | 7/2006 | Matsumoto et al. |
| 2006/0176861 | A1 | 8/2006 | Schmidt |
| 2007/0297416 | A1 | 12/2007 | Boley et al. |
| 2008/0033604 | A1 | 2/2008 | Margolin |
| 2008/0130668 | A1 | 6/2008 | Balakrishnan et al. |
| 2008/0253282 | A1 | 10/2008 | Kissel |
| 2008/0267181 | A1 | 10/2008 | Monga et al. |
| 2009/0069957 | A1 | 3/2009 | Nakamura |
| 2010/0015972 | A1 | 1/2010 | Hong et al. |
| 2010/0234071 | A1 | 9/2010 | Shabtay et al. |
| 2010/0302359 | A1 | 12/2010 | Adams et al. |
| 2011/0149849 | A1 | 6/2011 | Brownrig |
| 2012/0170523 | A1 | 7/2012 | Civanlar |
| 2012/0327847 | A1 * | 12/2012 | Rundquist .......... H04B 7/18582 370/316 |
| 2014/0247721 | A1 | 9/2014 | Arisoylu et al. |
| 2015/0078332 | A1 | 3/2015 | Sidhu et al. |
| 2015/0168144 | A1 | 6/2015 | Barton et al. |
| 2016/0006695 | A1 | 1/2016 | Prodoehl et al. |
| 2016/0328979 | A1 | 11/2016 | Postrel |

OTHER PUBLICATIONS

"Final Office Action Issued in U.S. Appl. No. 15/493,155", dated Dec. 5, 2017, 20 Pages.

"Non-Final Office Action Issued in U.S. Appl. No. 15/493,155", dated Nov. 16, 2017, 14 Pages.

"Cellular Bonding", Dr. Rony Ohayon and Baruch Altman, TVTechnology, Feb. 1, 2012, 3 pages. https://www.tvtechnology.com/expertise/cellular-bonding.

"Ocean Vessel WiFi—VSAT and Cellular Bonding", Wei Ming, Apr. 4, 2012, 2 pages. https://forum.peplink.com/t/ocean-vessel-wifi-vsat-and-cellular-bonding/2532.

"A Scheme of Ad-hoc-Based D2D Communication in Cellular Netoworks", Haipeng Yao et. al., Ad Hoc & Sensor Wireless Networks, vol. 32, pp. 115-130, Jan. 24, 2016.

"Non-Final Office Action Issued in U.S. Appl. No. 15/722,499", dated Feb. 16, 2018, 24 Pages.

"Non-Final Office Action Issued in U.S. Appl. No. 14/671,009", dated Jan. 17, 2017, 17 Pages.

"Non-Final Office Action Issued in U.S. Appl. No. 14/671,009", dated Jul. 11, 2017, 22 Pages.

"Notice of Allowance Issued in U.S. Appl. No. 14/671,009", dated Sep. 14, 2017, 7 Pages.

* cited by examiner

PRIORITIZED TRANSMISSION OF DIFFERENT DATA TYPES OVER BONDED COMMUNICATION CHANNELS

CROSS-REFERENCE TO RELATED APPLICATIONS

This application claims the benefit of and priority to U.S. Provisional Patent Application Ser. No. 62/327,399 entitled "Local Radio Communication Between A Remotely Operated Aircraft And A Control Tower And Prioritized Transmission Of Different Data Types Over Bonded Communication Channels", filed Apr. 25, 2016 by Edward Lindsley et al., the entire contents of which are expressly incorporated by reference. This application is a continuation-in-part of and claims the benefit of and priority to U.S. patent application Ser. No. 14/671,009, entitled "Prioritized Transmission Of Different Data Types Over Bonded Communication Channels", filed Mar. 27, 2015 by Stefan E. De Nagy Koves Hrabar et. al., the entire contents of which are expressly incorporated by reference. That application claims the benefit of and priority to U.S. Provisional Patent Application Ser. No. 61/976,045 entitled "Prioritized Transmission Of Different Data Types Over Bonded Communication Channels", filed Apr. 7, 2014 by Stefan E. De Nagy Koves Hrabar, the entire contents of which are expressly incorporated by reference.

BACKGROUND

1. Background and Relevant Art

Bonding of mobile cellular network links refers to the process of combining the bandwidth of multiple individual links (individual modems) to produce a single high-bandwidth link. For example, multiple 3G or 4G links can be bonded together to provide solutions for transferring data with increased bandwidth requirements, such as, video. Typical bonding solutions are designed to broadcast a single video stream or general data.

BRIEF SUMMARY

The present invention extends to methods, systems, devices, apparatus, and computer program products for prioritized transmission of different data types over bonded communication modules. In some embodiments, different types of data, including radio communication data to and from aircraft control centers, are communicated between a remotely operated aerial vehicle (e.g., an unmanned aerial vehicle (UAV)) and a control station (e.g., where a pilot remotely controls the UAV) over a bonded communication link. The bonded communication link bonds together the capabilities (e.g., channels) of a plurality of communication devices at the remotely operated aerial vehicle.

Data associated with one or more components co-located at a UAV is accessed. A plurality of different data types included in the accessed data are identified. The plurality of different data types includes radio communication data. Reference is made to a data type prioritization scheme to assign a priority to each of the plurality of different data types, including the radio communication data. Link quality is monitored for each of a plurality of communication devices.

A subset of communication devices, from among the plurality of communication devices, is selected for transferring the accessed data based on the monitored link qualities and assigned priorities. The subset of communication devices is selected by balancing operating costs for one or more of the plurality of communication devices against having sufficient capability to reliably transfer the accessed data. The accessed data is routed through the bonded communication link in accordance with a data distribution scheme. The accessed data is routed based on the determined priority for each of the plurality of different data types, including the radio communication data, and the monitored link quality for each of the plurality of communication devices.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by practice. The features and advantages may be realized and obtained by means of the instruments and combinations particularly pointed out in the appended claims. These and other features and advantages will become more fully apparent from the following description and appended claims, or may be learned by practice as set forth hereinafter.

BRIEF DESCRIPTION OF THE DRAWINGS

The specific features, aspects and advantages of the present invention will become better understood with regard to the following description and accompanying drawings where.

DETAILED DESCRIPTION

Figure 1:
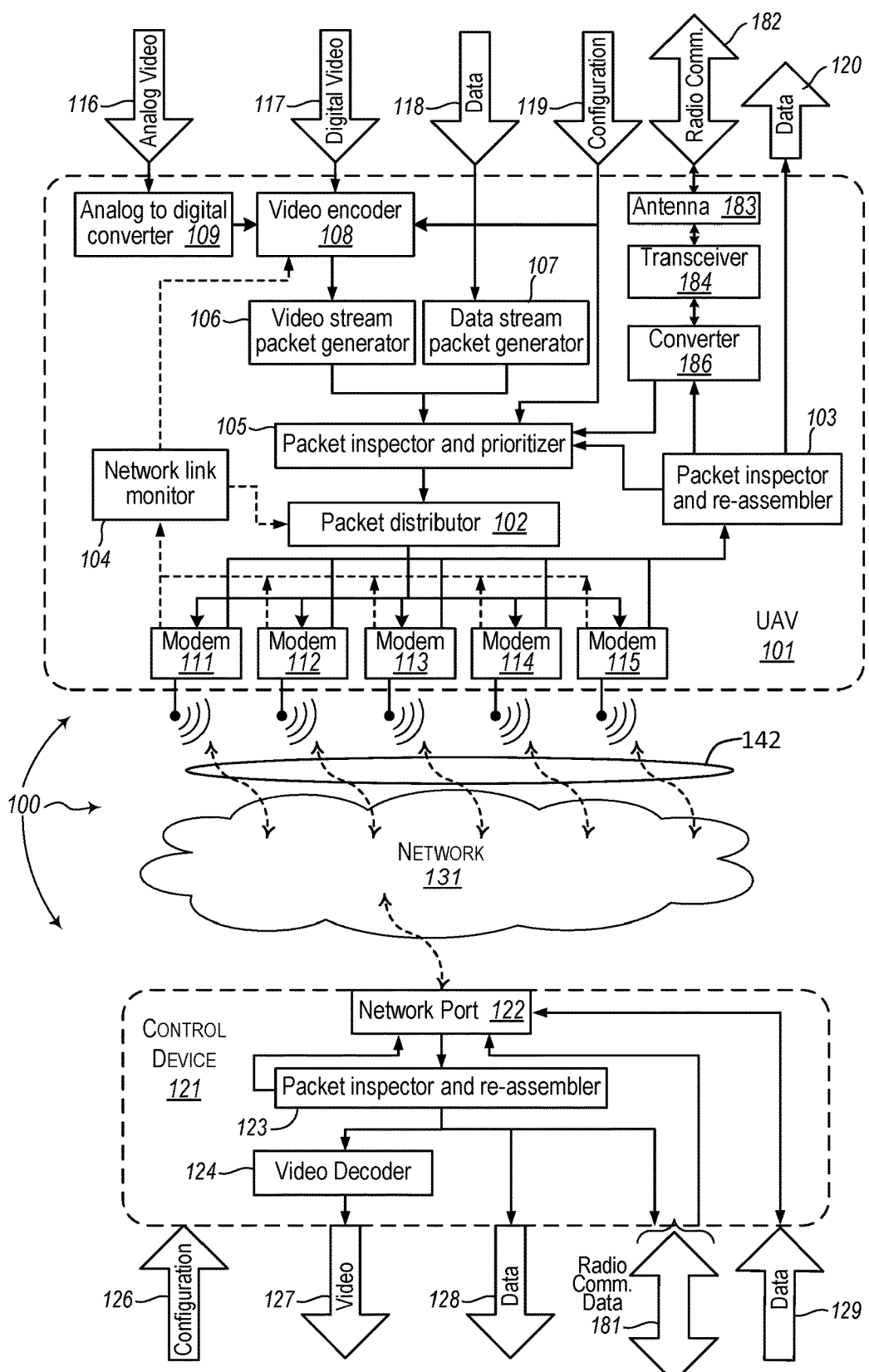
FIG. 1 illustrates an example architecture that facilitates prioritized transmission of different data types over bonded communication modules.

The present invention extends to methods, systems, devices, apparatus, and computer program products for prioritized transmission of different data types over bonded communication modules. In some embodiments, different types of data, including radio communication data to and from aircraft control centers, are communicated between a remotely operated aerial vehicle (e.g., an unmanned aerial vehicle (UAV)) and a control station (e.g., where a pilot remotely controls the UAV) over a bonded communication link. The bonded communication link bonds together the capabilities (e.g., channels) of a plurality of communication devices at the remotely operated aerial vehicle. Radio communication data can represent the content of radio communication transmissions (e.g., the content of VHF airband radio transmissions) that was or is to be transferred over a radio network.

Data associated with one or more components (e.g., flight components, monitoring components, cameras, a radio transceiver, etc.) co-located at a remotely operated aerial vehicle is accessed. A plurality of different data types (e.g., flight commands, telemetry, video data, etc.) included in the accessed data are identified. The plurality of different data types includes radio communication data. Reference is made to a data type prioritization scheme to assign a priority to each of the plurality of different data types, including the radio communication data. Link quality is monitored for each of a plurality of communication devices.

A subset of communication devices, from among the plurality of communication devices, is selected for transferring the accessed data based on the monitored link qualities and assigned priorities. The subset of communication devices is selected by balancing operating costs for one or more of the plurality of communication devices against having sufficient capability to reliably transfer the accessed data. The accessed data is routed through the bonded communication link in accordance with a data distribution scheme. The accessed data is routed based on the determined priority for each of the plurality of different data types, including the radio communication data, and the monitored link quality for each of the plurality of communication devices.

In one aspect, accessed data of one assigned priority is routed over a first communication device included in the subset of communication devices. Accessed data of another assigned priority is routed over a second communication device included in the subset of communication devices. Components at the remotely operated aerial vehicle can refrain from routing accessed data over any non-selected communication devices.

The remotely operated aerial vehicle can be user-configurable, allowing different data types to be assigned different priorities. As such, the remotely operated aerial vehicle is able to selectively transmit higher priority data such that lower priority data is sacrificed first in the event of degraded quality at one or more communication devices (e.g., modems, network interface cards, etc.). Quality degradation may be in terms of reduced signal strength, reduced bandwidth or increased latency of the bonded link as a whole, or of one or more of the individual communication devices that are bonded.

Communication between the remotely operated aerial vehicle and a control device can be via a cellular or other wireless network. The control device includes a (e.g., Internet Protocol (IP)) network port providing a connection to the cellular or other wireless network. The port is able to re-assemble data streams (e.g., IP packets) received from the portable device and generate output data streams corresponding to the portable device input data sources. Both the remotely operated aerial vehicle and the control device include the ability to detect missing data packets and request packet resends.

In some aspects, different types of data are communicated between a remotely operated aerial vehicle (e.g., an unmanned aerial vehicle (UAV)) and a control station (e.g., where a pilot remotely controls the UAV) over bonded communication channels of one or more communication devices. In one aspect, data transmission is essentially simultaneous with each data type assigned a different priority.

For example, video from cameras mounted to a UAV and telemetry data indicating the status of vehicle flight systems at the UAV can be essentially simultaneously transmitted from the UAV to a control station. Command data for controlling the UAV can also be essentially simultaneously received at the remotely operated aerial vehicle from the control station. Radio communication data representing the content of radio transmissions received from an aircraft control center can be sent to the control station. Radio communication data representing the content of radio transmissions to be transmitted (and intended for an aircraft control center) can be received from the control station. The video, telemetry data, command data, and radio communication data can be transferred over bonded communication channels (e.g., from among 3G cellular, 4G cellular, satellite, Wi-Fi, WiMAX, etc.) at the remotely operated aerial vehicle.

Thus, aspects of the invention can be used to facilitate (e.g., more localized) radio communication between an operator (e.g., pilot) of a Remotely Operated Aerial Vehicle and a controlling entity when the operator (e.g., pilot) is physically located outside of (e.g., VHF) radio range from the controlling entity. In some aspects, a Remotely Operated Aerial Vehicle is a Remotely Piloted Aircraft (RPA) (and is potentially unnamed, for example, an Unmanned Aerial Vehicle (UAV)). In some aspects, a remotely operated aerial vehicle is a rotor-based UAV that includes a plurality of rotors. In some aspects, a rotor-based UAV is a quad-rotor UAV. In other aspects, a rotor-based UAV includes five or more rotors. A rotor based UAV can use rotors for one or more of: lift, maneuvering, and to change orientation, including vertical takeoff and landing ("VTOL").

In this description and the following claims, "Airband" or "Aircraft band" is defined as a group of frequencies in the VHF radio spectrum allocated to radio communication in civil aviation, sometimes also referred to as VHF, or phonetically as "Victor". Different sections of the band are used for radio navigational aids and air traffic control. The VHF airband can use frequencies between 108 and 137 MHz. The lowest 10 MHz of the band, from 108-117.95 MHz, can be split into 200 narrow-band channels of 50 kHz. These can be used for navigational aids such as VHF Omni Directional Radio Range ("VOR") beacons, and precision approach systems such as Instrument Landing System ("ILS") localizers.

Aircraft communications radio operations can use amplitude modulation (AM), such as, for example, A3E double sideband with full carrier on VHF and UHF, and J3E single sideband (SSB) with suppressed carrier on HF. AM and SSB permit stronger stations to override weaker or interfering stations. Alternative analog modulation schemes, such as the "CLIMAX" multi-carrier system and offset carrier techniques can also be used. Aspects of the invention can also be used when airband communication is facilitates with digital radios.

A reliable, low-latency, high-bandwidth communications link may be useful for transmitting a variety of different types of data. For example, an unmanned aerial vehicle (UAV) may be fitted with surveillance cameras (in addition to flight components, wireless communication components, a radio system etc.). The UAV can use a reliable, low-latency, high-bandwidth communications link for sending radio communication data (e.g., corresponding to received VHF airband communication), video and telemetry data to a ground-based operator and for receiving radio communication data (e.g., to be transmitted as VHF airband communication) and commands from the ground-based operator. Telemetry data is used to monitor the state of the aircraft and commands are used to control vehicle operation. Radio communication data can include tower and/or control center instructions and responses.

As such, radio communication data (e.g., corresponding to VHF airband communication), telemetry data and command data can have increased mission importance relative to video. Failure to transmit telemetry data, and/or receive command data could cause control of a remotely operated aerial vehicle to be lost. For example, for a UAV, losing ground-to-aircraft command data could result in total loss of the UAV. Failure to transmit or receive tower radio communications has safety implications for the remotely operated aerial vehicle as well as other aircraft Some techniques rely on separate, un-bonded links for transmitting video and telemetry data from an aircraft to the ground, and command data from the ground to the aircraft. Thus, if a channel for telemetry and/or commands is malfunctioning and another channel for video is operational and/or has available bandwidth, there may be no way to make use of (or "take over") the other channel for telemetry data and/or commands. If the malfunction is significant, an aircraft could potentially be lost even though a functioning communication channel exists.

On the other hand, interruption of a video stream would not adversely affect the integrity and/or safety of the UAV (or other aircraft). Thus, radio communication data, telemetry data, and command data can be given higher priority relative to video. In the event of a malfunction or degraded quality of a link, video and other lower priority data can be sacrificed to increase the chances of radio communication data, telemetry data, and/or command data being appropriately transferred.

As described, a remotely operated aircraft can be operated by an operator (e.g., a certified pilot) from a control station. In one aspect, the operator can use the control station to fly the remotely operated aircraft past line of sight. The remotely operated aircraft can be certified for past line of sight flight by appropriate government and/or regulatory authorities, such as, for example, the Federal Aviation Administration (FAA), Transport Canada Civil Aviation (TCCA), European Aviation Safety Agency (EASA), Civil Aviation Administration of China (CAAC), etc. for the country in which it is operating.

A remotely operated aerial vehicle can include wireless communication components (e.g., one or more modems) for wireless communication with a control station via one or more wireless networks. The one or more wireless networks can span various communication channels (e.g., bonded and/or redundant cellular channels, satellite channels, WiMax channels, etc.) between the remotely operated aerial vehicle and the control station. In general, the control station uses the wireless communication channels to exchange data with the remotely operated aerial vehicle and vice versa. For example, the control station can use the wireless communication channels to communicate (data and/or voice) with the remotely operated aerial vehicle, to send operator commands to the remotely operated aerial vehicle, to receive vehicle status from remotely operated aerial vehicle, etc.

The remotely operated aerial vehicle can also include radio communication components (e.g., transceiver and antenna) for radio communication via a radio network. For example, the remotely operated aerial vehicle can include a radio system for radio communication with controlling entities (e.g., aircraft control centers). The radio system can include a transmitter, a receiver, and an antenna. In one aspect, the radio system facilitates Very High Frequency (VHF) radio communication (e.g., between 30 MHz to 300 MHz and more particularly VHF airband communication in frequencies between 108 MHz and 137 MHz) and/or Ultra High Frequency (UHF) radio communication (e.g., between 300 MHz and 3 GHz). However, other communication mechanisms are also contemplated. The receiver can receive radio communication (e.g., VHF and/or UHF communication) from a controlling entity (e.g., a control center) or other aircraft. The transmitter can transmit radio communication (e.g., VHF and/or UHF communication) to a controlling entity (e.g., a control center) or other aircraft. The antenna can convert electric power into radio waves, and vice versa.

To transmit, the transmitter supplies an electric current oscillating at radio frequency (e.g., a high frequency alternating current (AC)) to the antenna's terminals. The antenna radiates the energy from the current as electromagnetic waves (i.e., radio waves) at the radio frequency. To receive, the antenna intercepts some of the power of an electromagnetic wave in order to produce a tiny voltage at its terminals, that is applied to a receiver to be amplified.

The remotely operated aerial vehicle further includes a communication converter. The communication converter can convert between wireless communication formats compatible for transmission via the one or more wireless networks and radio communication formats compatible for transmission via the radio network and vice versa. For example, the communication converter can convert communication from cellular (or satellite) to VHF radio (e.g., VHF airband communication in frequencies between 108 and 137 MHz.) and/or UHF radio and vice versa. Accordingly, an operator (or pilot) flying a remotely operated aircraft from a control station can communicate with a controlling entity (e.g., a control center) using VHF radio and/or UHF radio communication as if the operator (or pilot) was essentially in the same physically location as the remotely operated aircraft. That is, VHF radio and/or UHF radio transmissions can originate from the remotely operated aircraft and VHF radio and/or UHF radio waves can be received at the remotely operated aircraft.

FIG. 1 illustrates an example architecture 100 that facilitates prioritized transmission of different data types over bonded communication modules. As depicted, architecture 100 includes a view of Unmanned Aerial Vehicle (UAV) 101, control device 121, and network 131 (e.g., a cellular network). In one aspect, UAV 101 is certified for past line of sight flight by appropriate government and/or regulatory authorities, such as, for example, the Federal Aviation Administration (FAA), Transport Canada Civil Aviation (TCCA), European Aviation Safety Agency (EASA), Civil Aviation Administration of China (CAAC), etc. for the country in which it is operating. UAV 101 can be powered on and a certified pilot (e.g., through control device 121) can be maneuvering UAV 101 on the ground or in the air.

UAV 101 includes packet distributor 102, packet inspector and re-assembler 103, network link monitor 104, packet inspector and prioritize 105, video stream packet generator 106, data stream packet generator 107, video encoder 108, analog to digital converter 109, modems 111, 112, 113, 114, and 115, antenna 183, transceiver 184, converter 186, and one or more other antennas (not shown). The individual bandwidth provided by channels at each of modems 111, 112, 113, 114, and 115 can be bonded into bonded communication link 142.

Packet distributor 102 is configured to inspect headers of incoming data (e.g., Internet Protocol (IP) packets) to establish their priority. Based on priority and a packet distribution scheme, packet distributor 102 routes packets to individual modems from among modems 111, 112, 113, 114, and 115 taking into account modem link qualities.

Packet inspector and re-assembler 103 is configured to receive data (e.g., IP packets) from modems 111, 112, 113, 114, and 115 and place them in a buffer. Packet inspector and re-assembler 103 can search the buffer for the next packet in the sequence based on the packet sequence numbers. If a packet is still missing after a timeout, a resend request is sent with higher priority. Once the next packet in the sequence has been found it is output via the data output port 120.

For outgoing radio (e.g., VHF airband) communication, a packets of radio communication data, such as, for example, radio communication data 181, can be received from control device 121. In one aspect, radio communicating data is received via a microphone at control device 121 (e.g., an operator of control device 121 can speak into the microphone). The packets of radio communication data 181 can be passed to converter 186 for transmission as radio communication 182. Converter 186 can convert the packets for radio transmission by transceiver 184. Transceiver 184 can convert the packet to electrical current. Antenna 183 can in turn transmit the electrical current as radio waves (e.g., including radio communication directed to a control center (e.g., tower)). In one aspect, transmitted radio waves are in the VHF airband radio communication frequencies (but can also be in other VHF frequencies or can be in UHF frequencies).

For incoming radio waves at radio 182, antenna 183 can convert received radio waves to electrical currents. Transceiver 184 can process the electrical currents into radio communication. Converter 186 can convert the radio communication to data packets of radio communication data. Converter 186 can send the data packets to packet inspector and prioritizer 105. In one aspect, received radio waves are in the VHF airband radio communication frequencies (but can also be in other VHF frequencies or can be in UHF frequencies).

Network link monitor 104 is configured to monitor the link quality of each of modems 111, 112, 113, 114, and 115. Network link monitor 104 can send monitored link quality information to other modules of UAV 101 and/or to control device 121.

Packet inspector and prioritizer 105 is configured to inspect headers of incoming data (e.g., IP packets) to establish a data type. A data type can be, for example, any of: radio communication data, telemetry data, command data, video data, audio data, etc. Using a data type prioritizing scheme and data type priorities provided via configuration input, packet inspector and prioritizer 105 can insert a priority identifier in each (e.g., IP packet) header. Packet distributed 102 can refer to the priority identifiers when routing data through one or more of modems 111-115.

Video stream packet generator 106 takes an encoded video stream and breaks it up into a sequence of (e.g., IP) packets. Video stream packet generator 106 can insert a label in each packet header to identify it as a video stream packet. Video stream packet generator 106 can also insert a packet sequence number in the header to allow re-assembling packets in the correct order once received by the receiver.

Data stream packet generator 107 is configured to take an input data stream and break it up into a sequence of (e.g., IP) packets. Data stream packet generator 107 can insert a label in each packet header to identify it as a data packet. In some embodiments, different labels are also used to distinguish between different types of data, such as, for example, operational data, status data, etc. Different types of data can come from different systems, such as, flight systems (e.g., at, integrated with, and/or attached to UAV 101). Different types of data can include radio data, power data (e.g., battery status), engine data, environmental data (e.g., temperature, altitude, direction, etc.), etc.

Video encoder 108 is configured to encode a digital video stream into a lower bitrate format by employing a compression algorithm (such as H.264). A target bitrate can be specified via configuration input. The degree of compression can be varied based on feedback from the network link monitor 104, so that the bitrate is adjusted to correspond to available bandwidth of bonded communication link 142.

Analog to digital converter 106 is configured to covert analog video to digital video for processing at video encoder 108.

As described, antenna 183 can convert received radio waves (e.g., from a control tower) to electrical currents. Transceiver 184 can process the electrical currents into radio communication. Converter 186 can convert the radio communication to one or more packets of radio communication data. Converter 186 can send the one or more packets of radio communication data to packet inspector and prioritizer 105.

In some embodiments, UAV 101 also includes one or more separate audio input channels (analog and/or digital). In these embodiments, UAV 101 also includes appropriate components for converting analog audio to digital audio, encoding a digital audio stream, and breaking an audio stream into a sequence of packets.

Accordingly, the depicted components of UAV 101 can be connected to and exchange data with other components at UAV 101. For example, analog to digital converter 109 can receive analog video from analog video input 116. Analog video can be captured at analog cameras (e.g., at, integrated with, and/or attached to UAV 101). Video encoder 108 can receive digital video from digital video input 117. Digital video can be captured at digital cameras (e.g., at, integrated with, and/or attached to UAV 101). Analog to digital converter 109 can convert analog video into digital video. Video encoder 108 can encode digital video and converted analog video into a video stream.

Alternately or in combination, analog and/or digital audio can be captured at condensers (e.g., at, integrated with, and/or attached to UAV 101). An audio encoder can encode digital audio and convert analog audio into an audio stream.

Data stream packet generator 107 can receive data (e.g., telemetry data of different data types) from data input 118. Data can originate at other (e.g., vehicle, flight, monitoring etc.) systems and/or components (e.g., at, integrated with, and/or attached to UAV 101). Data stream packet generator 107 can turn data 118 into a data stream. Packet inspector and prioritizer 105 can receive configuration (e.g., telemetry data of different data types) from device configuration input 119. Configuration 119 can indicate the configuration of other (e.g., vehicle, flight, monitoring, etc.) systems and/or components (e.g., at, integrated with, and/or attached to UAV 101).

Packet inspector and re-assembler 103 can receive data (e.g., IP packets) from modems 111, 112, 113, 114, and 115. Packet inspector and re-assembler 103 can formulate data (e.g., commands) to output to other components at data output 120. Data can be output to other (e.g., vehicle, flight, mentoring, etc.) systems and/or components (e.g., at, integrated with, and/or attached to UAV 101) to give commands to those other systems. Packet inspector and re-assembler 103 can also formulate radio communication data to send to converter 186.

As depicted, control device 121 includes network port 122 (e.g., a wired connection), inspector and re-assembler 123, and video decoder 124.

Inspector and re-assembler 123 is configured to receive data (e.g., IP packets) from network 131 through network port 122. Inspector and re-assembler 123 can sort data into buffers based on data type. A data type can be, for example, one of one or more different types of radio communication data, telemetry data, command data, video, audio, etc. Inspector and re-assembler 123 searches each buffer for the next packet in the sequence of that data type based on the packet sequence numbers. If a packet is still missing after a timeout, a resend request is sent. Once the next packet in the sequence has been found for a packet type, it is output to the appropriate stream. Video data can be output to video decoder 124, while data packets are output to the data output port 128. Radio communication data, such as, for example, radio communication data 181, can be sent to a headset or speakers for rendering to an operator of UAV 101.

Video decoder 124 is configured to decode video data (e.g., packets) into a digital video stream. Video decoder 124 can output a digital video stream at video output 127.

When appropriate, control device 121 can also include an audio decoder to decode audio data (e.g., packets) (which may be radio communication) into a digital audio stream and output the digital audio stream at an audio output port.

Data output at data output port 128, digital video stream data output at video output 127, and an audio data stream output at an audio output port can be presented at one or more output devices, for example, a display screen and speakers, associated with control device 121. Control device 121 can also receive configuration and data (e.g., commands for controlling UAV 101 through configuration input port 126 and data input port 129 respectively. Configuration input port 126 and data input port 129 can be connected to one or more input devices (e.g., vehicle control devices, such as, flight control devices) associated with control device 121. Input devices can include keyboards, mice, flight sticks, etc. manned, for example, by a vehicle operator (e.g., pilot).

Thus, generally, UAV 101 can transmit one or more of radio communication, other audio, video, telemetry data, etc. over network 131 to control device 121. Control device 121 can receive one or more of radio communication, other audio, video, telemetry data, etc. over network 131 from UAV 101. Similarly, control device 121 can send radio communication data and command data to UAV 101 over network 131. UAV 101 can receive radio communication data and command data over network 131 from control device 121.

A packet distribution scheme can be used to distribute data (e.g., IP packets). The packet distribution scheme minimizes disruption in transmission of higher priority data types when the signal quality degrades. Any of a variety of different schemes for distributing data (e.g., IP packets) between individual modems (e.g., from among modules 111, 112, 113, 114, and 115) based on their priority can be used.

In one aspect, telemetry navigation data is highest priority, Air Traffic Control (ATC) radio communication the second highest priority, other (payload) communication is the third highest priority, and sensor or peripheral data is the fourth highest priority.

In general, network link monitor 104 can establish which modem(s) have the best link quality, and packet distributor 102 can route the higher priority packets via these modem(s). For example, at UAV 101 a modem with higher (or even the best) link quality can be used exclusively for telemetry data or exclusively for certain types of telemetry data (or radio communication data).

In another embodiment, higher priority packets can be routed via a plurality of (and possible all) modems. Having higher priority, available bandwidth is allocated first to these packets. Packets with lower priority are relegated to being sent when remaining bandwidth permits.

Optionally, packet distributor 102 may refrain from distributing data through one or more modems due to cost in accordance with a packet distribution scheme. For example, if sufficient bandwidth is available from cheaper to operate modems (e.g., 1G) then other costlier to operate modems (e.g., satellite) are not used. When appropriate, dictated at least in part by link characteristics, costlier modems can be used to transfer higher priority data. For example, if all the 1G modems in a vehicle are out of range of a cell tower, a satellite modem can be used to transfer tower radio communication, send telemetry, and receive vehicle commands until 1G service is again available.

Thus, in general, UAV 101 can control the routing of radio communication data, telemetry data, command data, audio, and video between control device 121 and other systems and/or components of UAV 101 (e.g., at, integrated with, and/or attached to UAV 101). UAV 101 can give data types related to radio communication, data types related to monitoring specified (e.g., vehicle, flight, etc.) systems, and/or data types related to controlling specified (e.g., vehicle, flight, etc.) systems higher priority. Some telemetry data may be designated to have higher priority relative to other telemetry data and radio communication data. For example, telemetry data indicating a low engine battery can be given a higher priority than telemetry data indicating temperature. Similarly, some types of commands may be designated have higher priority over other types of commands. For example, a command to electrically isolate a malfunctioning battery can be given a higher priority than a command for panning or tilting a camera.

Figure 2:
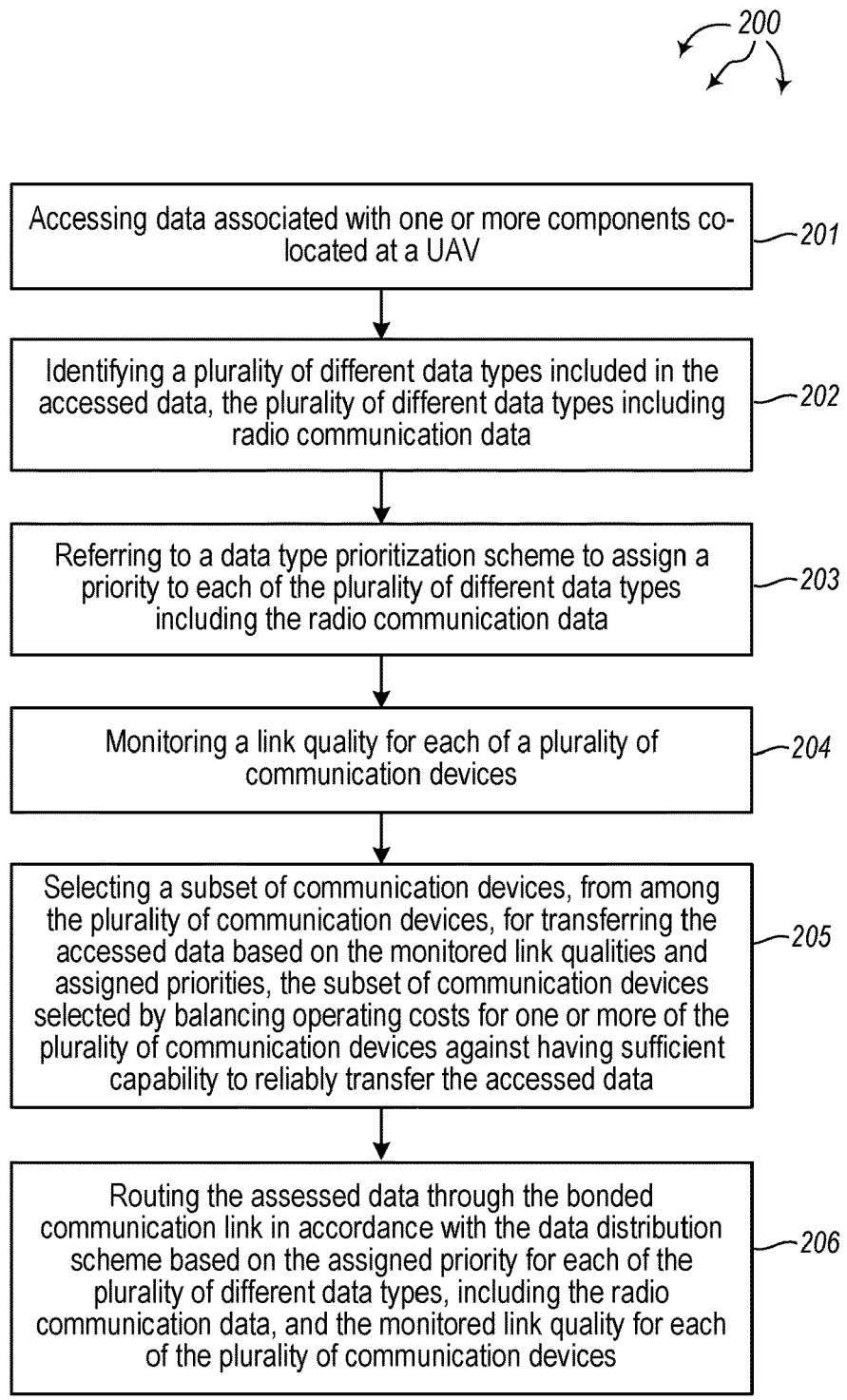
FIG. 2 illustrates a flow chart of an example method for prioritized transmission of different data types over bonded communication modules.

FIG. 2 illustrates a flow chart of an example method 200 for prioritized transmission of different data types over bonded communication modules. Method 200 will be described with respect to the components and data of computer architecture 100.

Method 200 includes accessing data associated with one or more components co-located with a UAV (201). For example, UAV 101 can access any of analog video 116, digital video 117, data 118, configuration 119, radio communication 182, and data 120.

Method 200 includes identifying a plurality of different data types included in the accessed data, the plurality of different data types including radio communication data (202). For example, packet inspector and prioritizer 105 can identify data types for any of: analog video 116, digital video 117, data 118, configuration 119, radio communication 182, and data 120. Method 200 includes referring to a data type prioritization scheme to assign a priority to each of the plurality of different data types including the radio communication data (203). For example, packet inspector and prioritizer 305 can refer to a data type prioritization scheme to assign a priority to any of: analog video 116, digital video 117, data 118, configuration 119, radio communication 182, and data 120.

Method 200 includes monitoring a link quality for each of a plurality of communication devices (204). For example, network link monitor 104 can monitor a link quality for each of modems 111-115. Link quality can be monitored on an ongoing basis, such as, for example, at specified intervals, in response to a request from any of modems 111-115, in response to a request from control device 121, when changes in data type or data volume are detected, when distance to a cell tower changes, when entering a new control area, etc.

Method 200 includes selecting a subset of communication devices, from among the plurality of communication devices, for transferring the accessed data based on the monitored link qualities and assigned priorities, the subset of communication devices selected by balancing operating costs for one or more of the plurality of communication devices against having sufficient capability to reliably transfer the accessed data (205). For example, network link monitor 104 can select modems 111-113 (a subset of modems 111-115) for transferring any of: analog video 116, digital video 117, data 118, configuration 119, radio communication 182, and data 120 to control device 121. The modems 111-113 can be selected based on the monitored link qualities for each of modems 111-115 and assigned priorities for any of: analog video 116, digital video 117, data 118, configuration 119, radio communication 182, and data 120.

The modems 111-113 can be selected to balance operating costs for one or more of modems 111-115 against having sufficient capability (e.g., bandwidth) to reliably transfer any of: analog video 116, digital video 117, data 118, configuration 119, radio communication 182, and data 120.

A selected subset of communication devices can change over time based on changes in monitored link qualities and/or changes to assigned data priorities.

Method 200 includes routing the accessed data through the bonded communication link in accordance with a data distribution scheme based on the determined priority for each of the plurality of different data types, including the radio communication data, and the monitored link quality for each of the plurality of communication devices (206). For example, packet distributor 102 can route any of: analog video 116, digital video 117, data 118, configuration 119, radio communication 182, and data 120 to control device 121 in accordance with a data distribution scheme. The routing can be based on the assigned priority for each of: analog video 116, digital video 117, data 118, configuration 119, radio communication 182, and data 120 and the monitored link quality for each of modems 111-115.

Routing the accessed data can include routing accessed data of one assigned priority over a first communication device included in the subset of communication devices. For example, packet distributor 102 can route radio communication 182 over modem 111. Routing the accessed data can include routing accessed data of another assigned priority over a second communication device included in the subset of communication devices. For example, packet distributor 102 can route configuration 119 over modem 112. Routing the accessed data can include refraining from routing accessed data over any non-selected communication devices. For example, packet distributor 102 can refrain from routing any data over modems 114 and 115.

As described, monitored link qualities and assigned priorities can be used to both facilitate selection a subset of communication devices and facilitate routing accessed data in accordance with a data distribution scheme.

In one aspect, data of higher priority is routed over communication devices having higher link quality and data of lower priority is routed over communication devices having lower link quality.

In some aspects, audio and video have a lower priority than other types of data (video can have a lower priority than audio or vice versa). The other data types can be designated to have higher or lower priority relative to one another. Data type designations can be made by a vehicle owner, a vehicle operator (e.g., pilot), set by (e.g., Federal Aviation Administration (FAA)) standards or regulations, etc. For UAVs, higher priority can be given to (e.g., telemetry, command, and radio communication) data related to the air worthiness and safety of the UAV.

Control device 121 can be software running on a personal computer. An operator (e.g., a pilot) can use control device 121 to operate UAV 101 past line of sight and possibly a significant distance away, for example, from another state or country In some aspects, data is prioritized based on an associated input or output port. Thus, UAV 101 could prioritize based on data stream. For example, UAV 101 could prioritize zero or more digital inputs and/or zero or more analog inputs.

Control device 121 can be at a fixed location or can be mobile. For example, control device 121 can be in a mobile command center (e.g., a land based vehicle). When control device 121 is mobile, control device 121 can also include a plurality of modems bonded into a bonded link (e.g., replacing port 122). In some embodiments, depending on available communication modules, UAV 101 is at, integrated with, and/or attached to other components and control device 121 is at, integrated with, and/or attached to another aircraft. The other aircraft can be another UAV. As such, one UAV can serve as a relay between another UAV and a ground station or other control center.

Modems in a bonded link (either in UAV 101 or control device 121) can be of the same or different brands, types, capabilities, etc. For example, a bonded link can include any and different combinations of 3G cellular, 4G cellular, satellite, Wi-Fi, WiMAX, etc., modems or interface cards. In some aspects, operating costs are balanced against having sufficient capabilities to reliable transfer accessed data. A bonded link can include a number of cheaper to operate modems (e.g., 3G) along with other more costly to operate modems (e.g., satellite). The more costly to operate modems can be used when the cheaper to operate modems fail to provide sufficient bandwidth for reliable transfer of accessed data and thus for safely operating a vehicle.

Aspects of the invention can be used to prioritize the routing of radio (e.g., VHF airband) communication, video, audio, and data to and from vehicles. The vehicles can be a land based, aerial (fixed wing and/or rotary), marine based (submersible or non-submersible), or space based vehicles. Vehicles can have a vehicle operator (either in the vehicle or operating the vehicle remotely). In one aspect, a vehicle is a Remotely Piloted Aircraft (RPA).

UAVs and control devices can include computer network connectivity components (e.g., a Network Interface Card ("NIC") or cellular modem) for wired or wirelessly connecting the cameras, condensers and other components to a computer network. As such, modules, algorithms, components, etc., for routing prioritized data, audio and video through a bonded link can also be connected to other modules, algorithms, components, etc., over (or be part of) a network, such as, for example, a Local Area Network ("LAN"), a Wide Area Network ("WAN"), and even the Internet. Accordingly, the modules, algorithms, components, etc., for routing prioritized data, audio and video through a bonded link as well as any other connected computer systems and their components (e.g., in a control or command center), can create message related data and exchange message related data (e.g., Internet Protocol ("IP") datagrams and other higher layer protocols that utilize IP datagrams, such as, Transmission Control Protocol ("TCP"), Hypertext Transfer Protocol ("HTTP"), Simple Mail Transfer Protocol ("SMTP"), etc. or using other non-datagram protocols) over the network.

As such, modules, algorithms, components, etc., for routing prioritized data, audio and video through a bonded link can be operated (e.g., remotely) over the computer network. When a control system (e.g., control device 121) is used to control a vehicle (whether the vehicle is manned or unmanned), the control system can also be used to control routing prioritized data, audio and video at a vehicle through a bonded link.

In some aspects, routing prioritized radio (e.g., VHF airband) communication, data, audio, and video through a bonded link is provided though autonomous operation by a robotic vehicle or system. For example, a robotic vehicle or system can route prioritized data, audio and video through a bonded link.

Wireless Communication Between an Operative of a Remotely Operated Aircraft and a Controlling Entity Aspects of the invention also extend to methods, systems, devices, apparatus, and computer program products for wireless communication between an operator of a remotely operated aircraft and a controlling entity. A remotely operated aircraft is operated by an operator (e.g., pilot) from a control station. The operator can use the control station to fly the remotely operated aircraft past line of sight. The remotely operated aircraft can be certified for past line of sight flight by appropriate government and/or regulatory authorities, such as, for example, the Federal Aviation Administration (FAA), Transport Canada Civil Aviation (TCCA), European Aviation Safety Agency (EASA), Civil Aviation Administration of China (CAAC), etc. for the country in which it is operating.

The remotely operated aircraft includes wireless communication components (e.g., one or more modems) for wireless communication via one or more wireless networks. The one or more wireless networks can span various communication channels (e.g., bonded and/or redundant cellular channels, satellite channels, WiMax channels, etc.) between the remotely operated aerial vehicle and the control station. In general, the control station uses the wireless communication channels to exchange data with the remotely operated aircraft. For example, the control station can use the wireless communication channels (e.g., any of modems 111-115 over network 131) to communicate (data and/or voice) with the remotely operated aerial vehicle, to send operator commands to the remotely operated aerial vehicle, to receive vehicle status from remotely operated aerial vehicle, etc.

The remotely operated aircraft also includes radio communication components (e.g., transceiver and antenna) for radio communication via a radio network. For example, the remotely operated aerial vehicle can include a radio system for radio communication with controlling entities (e.g., control centers). The radio system can include a transmitter, a receiver, and an antenna. In one aspect, the radio system facilitates Very High Frequency (VHF) radio communication (e.g., between 30 MHz to 300 MHz and more particularly VHF airband communication in frequencies between 108 MHz and 137 MHz) and/or Ultra High Frequency (UHF) radio communication (e.g., between 300 MHz and 3 GHz). However, other communication mechanisms are also contemplated. The receiver can receive radio communication (e.g., VHF and/or UHF communication) from a controlling entity (e.g., a control center) or other aircraft. The transmitter can transmit radio communication (e.g., VHF and/or UHF communication) to a controlling entity (e.g., a control center) or other aircraft. The antenna can convert electric power into radio waves, and vice versa.

To transmit, the transmitter supplies an electric current oscillating at radio frequency (e.g., a high frequency alternating current (AC)) to the antenna's terminals. The antenna radiates the energy from the current as electromagnetic waves (i.e., radio waves) at the radio frequency. To receive, the antenna intercepts some of the power of an electromagnetic wave in order to produce a tiny voltage at its terminals, that is applied to a receiver to be amplified.

The remotely operated aircraft further includes a communication converter. The communication converter can convert between wireless communication formats compatible for transmission via the one or more wireless networks and radio communication formats compatible for transmission via the radio network and vice versa. For example, the communication converter can convert communication from cellular (or satellite) to VHF radio (e.g., VHF airband communication in frequencies between 108 and 137 MHz.) and/or UHF radio and vice versa. Accordingly, an operator (or pilot) flying a remotely operated aircraft from the control station can communicate with a controlling entity (e.g., a control center) using VHF radio and/or UHF radio communication as if the operator (or pilot) was essentially in the same physically location as the remotely operated aircraft. That is, VHF radio and/or UHF radio transmissions can originate from the remotely operated aircraft and VHF radio and/or UHF radio waves can be received at the remotely operated aircraft.

In one aspect, the radio components are used to receive radio communication via the radio network (e.g., VHF airband). The radio communication is in a radio format compatible for transmission over the radio network. The radio communication is received from an aircraft control center transmission. The communication converter converts the radio communication from the radio format to another format. The other format is compatible for transmission over another wireless communication network (e.g., cellular channels, satellite channels, WiMax channels, etc.). The wireless communication components are used to send the wireless communication in the other format via the other wireless communication network (e.g., network 131). The wireless communication is sent to a control station used to control the remotely operated aircraft.

In another aspect, the wireless communication components are used to receive other wireless communication (that may be responsive to the wireless communication) via a (e.g., the other) wireless communication network (e.g., cellular channels, satellite channels, WiMax channels, etc.). The other wireless communication is in a (e.g., the other) format compatible for transmission over the (e.g., other) wireless communication network (e.g., network 131). The other wireless communication is received from the control station used to control the remotely operated aircraft. The communication converter converts the other wireless communication from the format to the radio format. The radio components are used to send the other wireless communication in the radio format to the aircraft control center via the radio network (e.g., VHF airband).

Accordingly, aspects of the invention can be used to facilitate (e.g., more localized) radio communication between an operator (e.g., pilot) of a remotely operated aircraft and a controlling entity (e.g., a control center) when the operator (e.g., pilot) is physically located outside of (e.g., VHF and/or UHF) radio range from the controlling entity. In some aspects, a remotely operated aircraft is a certified Remotely Piloted Aircraft (RPA) (and is potentially unmanned, for example, an Unmanned Aerial Vehicle (UAV)) being controlled by a certified pilot.

Figure 3:
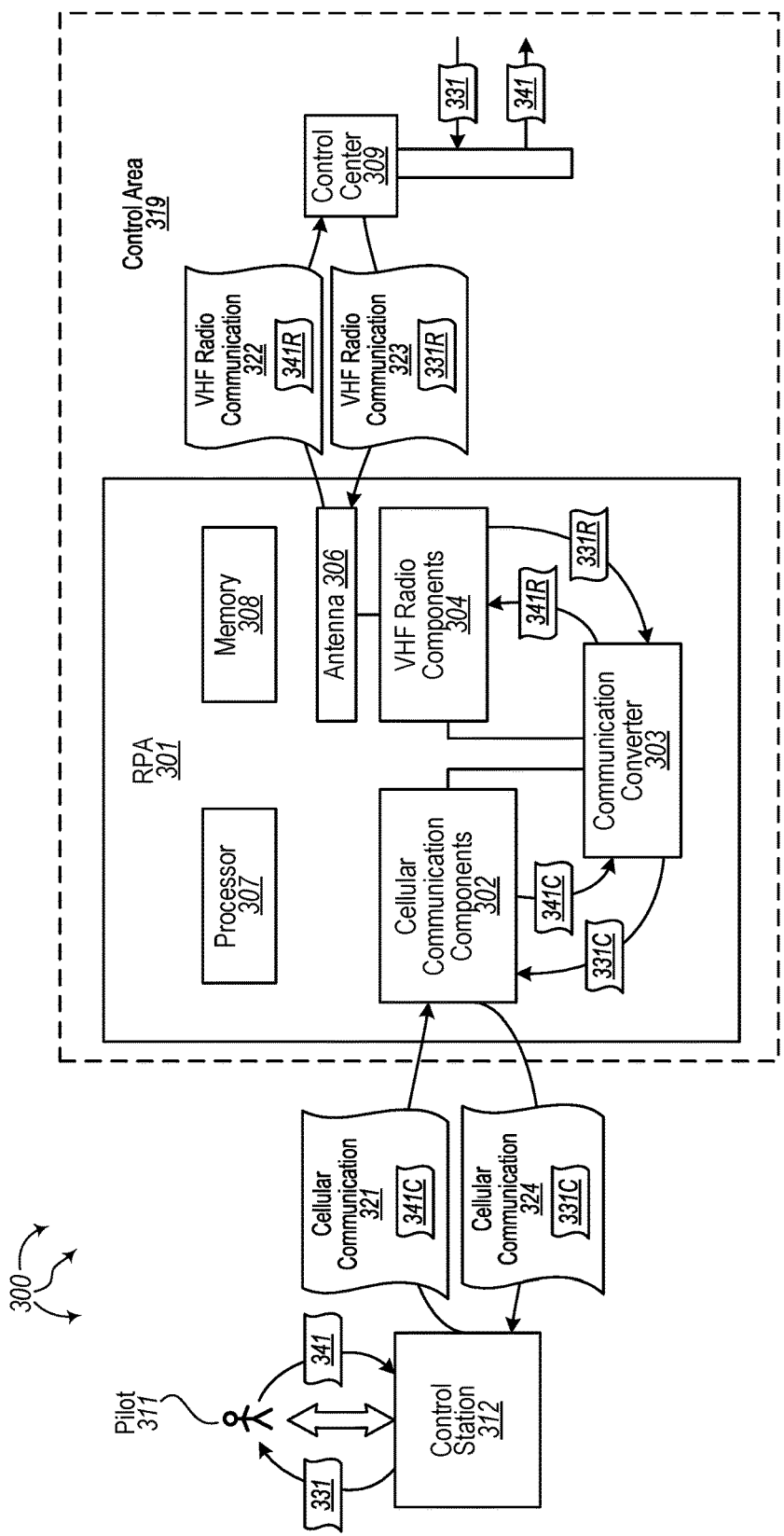
FIG. 3 illustrates an example architecture that facilitates radio communication between an operator of a Remotely Operated Aircraft and a control center.

Turning to FIG. 3, FIG. 3 illustrates an example architecture 300 that facilitates radio communication between pilot 311 of Remotely Piloted Aircraft (RPA) 301 and control center 309. Architecture 300 includes RPA 301, control center 309, control station 312, and pilot 311. In general, pilot 311 uses control station 312 to communicate with and control (e.g., flight characteristics of) RPA 301. In one aspect, pilot 311 is a certified pilot operating RPA 301 past line of sight and possibly a significant distance away, for example, from another state or country. RPA 301 can be certified for past line of sight flight by appropriate government and/or regulatory authorities, such as, for example, the Federal Aviation Administration (FAA), Transport Canada Civil Aviation (TCCA), European Aviation Safety Agency (EASA), Civil Aviation Administration of China (CAAC), etc. for the country in which it is operating.

Control station 312 can communicate with RPA 301 using wireless technologies including bonded and/or redundant cellular channels, satellite channels, WiMax channels, etc. For example, control station 312 can use cellular communication to communicate with (both send data and commands to and receive data and telemetry from) RPA 301. Cellular communication can be used to transfer data as well as voice communication between control station 312 and RPA 301. Pilot 311 can utilize audio input device(s) (e.g., a microphone) and audio output devices (e.g., speakers, headphones, etc.) at control station 312 to exchange voice communication (or other audio data) with RPA 301.

As depicted, RPA 301 includes cellular communication components 302 (e.g., circuitry), communication converter 303, VHF radio communication components 304 (e.g., transmitter and receiver circuitry), antenna 306, processor 307, and memory 308. Cellular communication components 302 are configured to exchange (send and receive) cellular communication (voice and/or data) with other systems, such as, for example, control station 312. Communication converter 303 is configured to convert (voice and/or data) between cellular communication and VHF (e.g., VHF airband) radio communication. VHF radio communication components 304 are configured to exchange (send and receive) VHF radio communication (voice and/or data) with other systems, such as, for example, control center 309.

During operation, pilot 311 can maneuver RPA 301 (e.g., on the ground and/or in the air) within control area 319. In one aspect, pilot 311 flies RPA 301 into control area 319 from elsewhere. Control area 319 can be a geographical area of control, for example, an area around an airport, a flight information region, etc. controlled by control center 309. Control center 309 can control air traffic around an airport, ground traffic at an airport, etc. Control center 309 can be an Air Route Traffic Control Center (ARTCC), a TRACON (Terminal Radar Approach Control), an oceanic airspace controller (including oil rig mounted components), etc.

Figure 4A:
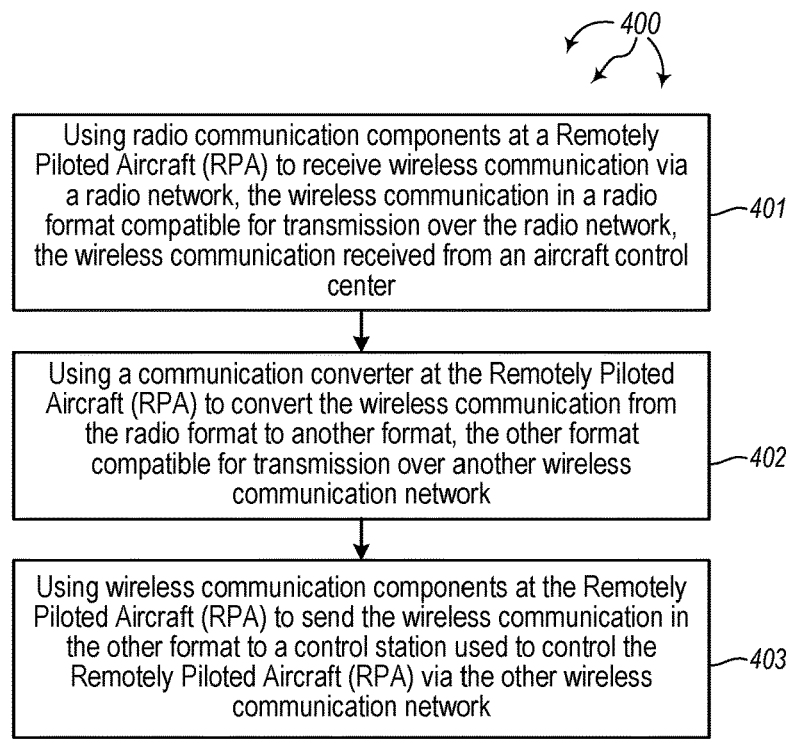
FIG. 4A illustrates a flow chart of an example method for transmitting wireless communication from a control center to an operator of a Remotely Operated Aircraft.

FIG. 4A illustrates a flow chart of an example method 400 for transmitting wireless communication from a control center to an operator of a Remotely Operated Aircraft. Method 400 will be described with respect to the components and data of architecture 300.

Method 400 includes using radio communication components at a Remotely Piloted Aircraft (RPA) to receive wireless communication via a radio network, the wireless communication in a radio format compatible for transmission over the radio network, the wireless communication received from an aircraft control center (401). For example, antenna 306 can receive the VHF radio (e.g., airband) communication 323 and convert the radio waves into electric current. The electric current can be processed at a receiver included in VHF radio communication components 304. The receiver and antenna 306 can interoperate to access voice communication 331 in radio format 331R.

Method 400 includes using a communication converter at the Remotely Piloted Aircraft (RPA) to convert the wireless communication from the radio format to another format, the other format compatible for transmission over another wireless communication network (402). For example, communication converter 303 can convert the voice communication 331 in radio format 331R into voice communication 331 in cellular format 331C. Cellular format 331C is compatible for transmission over a cellular network, such as, for example, a 3G cellular network, a 4G cellular network, or some other type of cellular network. Cellular format 331C can include one or more data packets representative of the content of VHF radio communication 323 (and thus also representative of the content of voice communication 331).

Method 400 includes using wireless communication components at the Remotely Piloted Aircraft (RPA) to send the wireless communication in the other format to a control station used to control the Remotely Piloted Aircraft (RPA) via the other wireless communication network (403). For example, cellular communication components 302 (e.g., a cellular modem) can transmit the voice communication 331 in cellular format 331C contained in cellular communication 324 over the cellular network.

Control station 312 can receive cellular communication 324 containing voice communication 331 in cellular format 331C over the cellular network. Cellular components at control station 312 (e.g., a cellular modem) can process cellular communication 324 to reform voice communication 331. Control station 312 can render voice communication 331 to pilot 311 at an audio output device, such as, headphones or speakers.

Figure 4B:
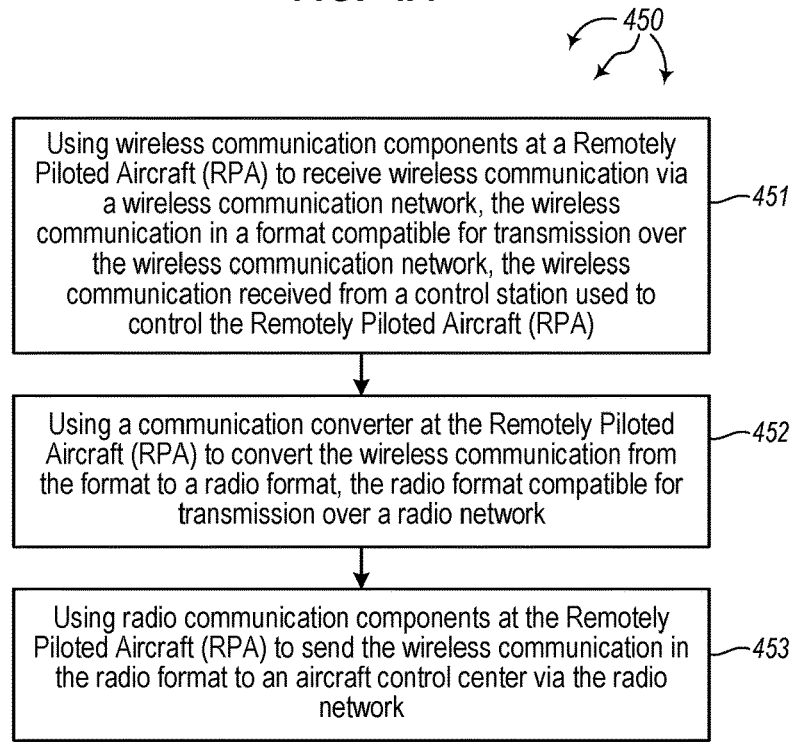
FIG. 4B illustrates a flow chart of an example method for transmitting wireless communication from an operator of a Remotely Operated Aircraft to a control center.

FIG. 4B illustrates a flow chart of an example method 450 for transmitting wireless communication from an operator of a Remotely Operated Aircraft to a control center. Method 450 will be described with respect to the components and data of architecture 300.

Pilot 311 can respond to voice communication 331. Pilot 311 can enter voice communication 341 (e.g., can speak) into a connected audio input device (e.g., a microphone) at control station 312. Voice communication 141 can be intended for personal at control center 309 (although others listening on the same frequency can also hear voice communication 341). Control station 312 can use cellular components (e.g., a cellular modem) to transmit voice communication 341 in cellular format 141C contained in cellular communication 321. Cellular format 341C can include one or more data packets representative of the content of Very High Frequency (VHF) radio communication.

Method 450 includes using wireless communication components at a Remotely Piloted Aircraft (RPA) to receive wireless communication via a wireless communication network, the wireless communication in a format compatible for transmission over the wireless communication network, the wireless communication received from a control station used to control the Remotely Piloted Aircraft (RPA) (451). For example, cellular communication components 302 can receive cellular communication 321 from control station 312. Cellular communication components 302 can process cellular communication 321 to access voice communication 341 in cellular format 341C.

Method 450 includes using a communication converter at the Remotely Piloted Aircraft (RPA) to convert the wireless communication from the format to a radio format, the radio format compatible for transmission over a radio network (452). For example, communication converter 303 can convert the voice communication 341 in cellular format 341C into voice communication 341 in radio format 341R. Radio format 341R is compatible for transmission over a radio network.

Method 450 includes using radio communication components at the Remotely Piloted Aircraft (RPA) to send the wireless communication in the radio format to an aircraft control center via the radio network (453). For example, a transmitter included in VHF radio communication components 304 can form electric currents representing VHF radio (e.g., airband) communication 322. Antenna 306 can convert the electric power into radio waves. The transmitter and antenna 306 can interoperate to transmit voice communication 341 in radio format 341R contained in VHF radio (e.g., airband) communication 322 (i.e., radio waves)

The radio system at control center 309 can receive VHF radio (e.g., airband) communication 322 containing voice communication 341 in radio format 341R.

For example, an antenna at control center 309 can receive the VHF radio (e.g., airband) communication 322 and convert the radio waves into electric current. The electric current can be processed at a receiver included in the radio system. The receiver and the antenna can interoperate to process VHF radio (e.g., airband) communication 322 to reform voice communication 341. Voice communication 341 can be rendered at an audio output device, such as, headphones or speakers at control center 309.

Thus, RPA 301 can essentially function as a mobile communication converter capable of converting between cellular and VHF communication and vice versa. Accordingly, a two-way voice communication link can be established between pilot 311 and personnel at control center 309 even though pilot 311 is outside of control area 319 (or otherwise out of VHF radio range from control center 309). One part of the two-way communication link is facilitated by the cellular network and another part of the two-way communication link is facilitated by the radio network.

Aspects of the invention also include converting between UHF radio communication and wireless communication on other wireless networks. For example, communication converter 303 (or another similar communication converter) can be configured to convert (voice and/or data) between cellular communication and UHF radio communication and vice versa. UHF radio communication components at RPA 301 can be configured to exchange (send and receive) UHF radio communication (voice and/or data) with other systems, such as, for example, control center 309.

Aspects of the invention also include conversion between VHF and/or UHF radio communications and other wireless formats, such as, satellite, Wi-Fi, WiMax, etc.

In one aspect, a handheld transceiver (e.g., aircraft radio) is mounted to RPA 301. Antenna 306 can be a 5-watt hi gain antenna. Pilot 311 wears a headset and can communicate to the control center 309 through a scrambled encrypted cellular control link, up to the handheld transceiver that is within VHF range of control center 309. This significantly increases safety for RPA 301 and other aircraft within controlled airspace. For example, pilot 311 can be in Miami while controlling RPA 301 in Los Angeles and even cause RPA 311 to enter the traffic pattern in Los Angeles. Pilot 311 can talk to a local control tower in Los Angeles via a cellular link between control station 312 and RPA 301 and a radio link between RPA 301 and the local control tower.

Similar mechanisms can be used for a transponder included in RPA 301. Ground control software can include a user adjustable setting to squawk whatever (e.g., 4-digit) transponder code is either demanded from a control center (e.g., tower) or to identify the particular mission the aircraft is flying so air traffic control knows what the aircraft is doing. A transponder can include a separate circuit board attached to a 5-watt antenna but controlled through a cellular (or other wireless) link.

Any of a variety of different transponders can be used. For example, any of Mode A, Mode C, Mode S, Automatic Dependent Surveillance-Broadcast ("ADS-B") can be used.

If the control tower says "RPA 301, turn left heading 090, ascend to one thousand two hundred, Squawk 1256 and ident", the message can be transmitted via VHF to RPA 301, converted to cellular communication at RPA 301, and transmitted to control station 312 via a cellular network. Pilot 311 can repeat those instructions verbally to verify she or he understands them accurately. The repeated instructions can be transmitted via the cellular network to RPA 301, converted to radio communication at RPA 101, and transmitted via VHF to the control tower. Pilot 311 can also dial the transponder to a new code of "1256" and touch the "ident" button which essentially reacts like a sonar ping on the controller's radar screen. The onboard transponder continues transmitting that code to ground antennas and other aircraft until changed. Both air traffic control and other aircraft can then see RPA 301. RPA 301 can be represented in radar similar to other smaller craft.

The transfer of radio commutation data containing the verbal instructions from the control tower, pilot 311's response, and the transponder code can be assigned a higher priority relative to other data being routed through cellular communication components 302.

RPA 101 may use various Federal Aviation Administration (FAA) transponder codes assigned specifically for use by remotely operated aircraft. For example, these transponder codes can begin with a zero and have any of three recommendations:

0911—Emergency response missions given priority vectoring over other remotely operated aircraft flying in the airspace from 0-400' Above Ground Level (AGL), 0060—Fast, direct routes at approximately 300' AGL like pipeline monitoring or beach patrols. (It looks like GO on the display), 0510—Low and slow at approximately 200' like power line inspections that may stop a lot. (It looks like SLO on the display).

The transfer of radio communication data containing any of these transponder codes, as well as other transponder codes, can be assigned a higher priority relative to other data being routed through cellular communication components 302.

In general, analog and/or digital systems can be used to monitor and control remotely operated aircraft (e.g., RPA 101). Monitoring and control equipment can be co-located with and/or separate one another. Information exchanged between remotely operated aircraft and monitoring and control equipment can be relayed over a wired and/or wireless communication networks.

Remotely operated aircraft can include computer network connectivity components (e.g., a Network Interface Card ("NIC") or cellular modem) for wired or wirelessly connecting the monitoring equipment to a computer network. As such, modules, algorithms, components, etc., for controlling the flight of remotely operated aircraft (e.g., direction, speed, acceleration, pitch, yaw, roll) can also be connected to other modules, algorithms, components, etc., over (or be part of) a network, such as, for example, a Local Area Network ("LAN"), a Wide Area Network ("WAN"), and even the Internet. Accordingly, the modules, algorithms, components, etc., for controlling the flight of remotely operated aerial vehicles (e.g., direction, speed, acceleration, pitch, yaw, roll) as well as any other connected computer systems and their components (e.g., in a control center), can create message related data and exchange message related data (e.g., Internet Protocol ("IP") datagrams and other higher layer protocols that utilize IP datagrams, such as, Transmission Control Protocol ("TCP"), Hypertext Transfer Protocol ("HTTP"), Simple Mail Transfer Protocol ("SMTP"), etc. or using other non-datagram protocols) over the network.

Combined Aspects

In some aspects, UAV 101 includes one or more of the components and functionalities depicted in and described with respect to computer architecture 300. In other aspects, RPA 301 includes one or more of the components and functionalities depicted in and described with respect to computer architecture 100. Accordingly, the various described aspects can be integrated together and interoperate with one another. For example, UAV 101 can facilitate wireless communication conversion between an operator (e.g., pilot) and a control center similar to RPA 301. RPA 301 can utilize a data prioritization scheme similar to UAV 101.

Aspects of the present invention may comprise or utilize a special purpose or general-purpose computer including computer hardware, such as, for example, one or more processors and system memory, as discussed in greater detail below. Aspects within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are computer storage media (devices). Computer-readable media that carry computer-executable instructions are transmission media. Thus, by way of example, and not limitation, Aspects of the invention can comprise at least two distinctly different kinds of computer-readable media: computer storage media (devices) and transmission media.

Computer storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to computer storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that computer storage media (devices) can be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Aspects of the invention can also be implemented in cloud computing environments. In this description and the following claims, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud computing model can be composed of various characteristics such as, for example, on-demand self-service, broad network access, resource pooling, rapid elasticity, measured service, and so forth. A cloud computing model can also expose various service models, such as, for example, Software as a Service ("SaaS"), Platform as a Service ("PaaS"), and Infrastructure as a Service ("IaaS"). A cloud computing model can also be deployed using different deployment models such as private cloud, community cloud, public cloud, hybrid cloud, and so forth. In this description and in the claims, a "cloud computing environment" is an environment in which cloud computing is employed.

In one aspect, one or more processors are configured to execute instructions (e.g., computer-readable instructions, computer-executable instructions, etc.) to perform any of a plurality of described operations. The one or more processors can access information from system memory and/or store information in system memory. The one or more processors can transform information between any of the described formats.

System memory can be coupled to the one or more processors and can store instructions (e.g., computer-readable instructions, computer-executable instructions, etc.) executed by the one or more processors. The system memory can also be configured to store any of a plurality of other types of data generated and/or transformed between any of the described formats by any of the described components.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed:

1. A method for use at a remotely operated aerial vehicle, the remotely operated aerial vehicle including a bonded communication link, the bonded communication link bonding together the capabilities of a plurality of communication devices, the method for routing data through the bonded communication link, the method comprising:
    accessing data associated with one or more other components co-located at the remotely operated aerial vehicle;
    identifying a plurality of different data types included in the accessed data, the plurality of different data types including radio communication data;
    referring to a data type prioritization scheme to assign a priority to each of the plurality of different data types including the radio communication data and another type of data;
    monitoring a link quality for each of the plurality of communication devices;
    selecting a subset of communication devices, from among the plurality of communication devices, for transferring the accessed data based on the monitored link qualities and assigned priorities, the subset of communication devices selected by balancing operating costs for one or more of the plurality of communication devices against having sufficient capability to reliably transfer the accessed data; and
    routing the accessed data through the bonded communication link in accordance with a data distribution scheme based on the assigned priority for each of the plurality of different data types, including the radio communication data, and the monitored link qualities, including:
        routing the radio communication data over a first communication device included in the subset of communication devices;
        routing the other type of data over a second communication device included in the subset of communication devices; and
        refraining from routing accessed data over any non-selected communication devices.

2. The method of claim 1, wherein the bonded communication link provides connectivity to a control device that controls operation of the remotely operated aerial vehicle.

3. The method of claim 1, wherein accessing data associated with one or more other components co-located at the remotely operated aerial vehicle comprises accessing radio communication data representing the content of a Very High Frequency (VHF) radio transmission from an aircraft control center.

4. The method of claim 1, wherein accessing data associated with one or more other components co-located at the remotely operated aerial vehicle comprises accessing at least one of: power data, engine data, and environmental data associated with operation of the remotely operated aerial vehicle.

5. The method of claim 1, wherein identifying a plurality of different data types included in the received data comprises identifying that the plurality of different data types includes one or more of: video data, audio data, telemetry data, and command data.

6. The method of claim 5, wherein identifying that the plurality of different data types includes one or more of: video data, audio data, telemetry data, and command data comprises identifying that the plurality of different data types include airworthiness telemetry data related to airworthiness of the remotely operated aerial vehicle and at least one other telemetry data type.

7. The method of claim 6, wherein referring to a data type prioritization scheme to assign a priority to each of the plurality of different data types comprises:
    assigning a higher priority to the airworthiness telemetry data than to the at least one other telemetry data type, the video data and the audio data; and
    assigning a higher priority to the at least one other telemetry data type than to the video data and the audio data.

8. The method as recited in claim 7, wherein routing accessed data of another assigned priority over a second communication device comprises routing data of the at least one other telemetry data type over another communication device, from among the selected subset of communication devices, with degraded link quality relative to the higher link quality; and
    further comprising routing one or more of: the audio data and the video data over a further communication device, from among the selected subset of communication devices, with further degraded link quality relative to the degraded link quality.

9. The method of claim 5, wherein identifying that the plurality of different data types includes one or more of: video data, audio data, telemetry data, and command data comprises identifying that the plurality of different data types include a telemetry data type and airworthiness command data related to airworthiness of the remotely operated aerial vehicle.

10. The method of claim 9, wherein referring to a data type prioritization scheme to assign a priority to each of the plurality of different data types comprises:
    assigning a higher priority to the airworthiness command data than to the telemetry data, the video data, and the audio data; and
    assigning a higher priority to the telemetry data type than to the video data and the audio data.

11. The method of claim 10, wherein routing accessed data of another assigned priority over a second communication device comprises routing data of the telemetry data type over another communication device, from among the selected subset of communication devices, with degraded link quality relative to the higher link quality; and
    further comprising routing one or more of: the audio data and the video data over a further communication device, from among the selected subset of communication devices, with further degraded link quality relative to the degraded link quality.

12. The method of claim 9, wherein referring to a data type prioritization scheme to assign a priority to each of the plurality of different data types comprises:
   assigning a higher priority to the telemetry data type and the command data type than to video data and audio data; and
   assigning a higher priority to the command data type than the telemetry data type.

13. The method of claim 12, wherein routing radio communication data over a first communication device comprises routing data packets representing the content of a Very High Frequency (VHF) airband transmission over a satellite communication device; and
   wherein routing the other type of data over a second communication device comprises comprising routing the other type of data over a 3G or 4G modem.

14. The method of claim 9, wherein identifying that the plurality of different data types include airworthiness command data related to airworthiness of the remotely operated aerial vehicle comprises identifying that the plurality of different data types include airworthiness command data received from one or more flight control devices at a control station.

15. The method of claim 1, wherein accessing data associated with one or more components co-located at the remotely operated aerial vehicle comprises accessing radio communication data associated with an Ultra High Frequency (UHF) radio transmission.

16. The method of claim 1, wherein the one or more components co-located at the remotely operation aerial vehicle comprise the one or more components co-located at a Remotely Piloted Aircraft (RPA).

17. A Remotely Piloted Aircraft (RPA), the RPA comprising:
   one or more flight related components providing flight functionality of the RPA, the one or more flight related components controlled remotely from a remote pilot station;
   one or more other components providing other functionality;
   a hardware processor;
   system memory coupled to the one or more hardware processors, the system memory storing instructions that are executable by the one or more hardware processors;
   a bonded communication link, the bonded communication link bonding together the capabilities of a plurality of communication devices;
   the hardware processors executing the instructions stored in the system memory to route data through the bonded communication link, including the following:
      access data associated with one or more components of the RPA;
      identify a plurality of different data types included in the accessed data, the plurality of different data types including radio communication data and telemetry data, the radio communication data representing the content of a Very High Frequency (VHF) airband radio transmission from an aircraft control center, the telemetry data from one of the one or more flight related components, the telemetry data related to the airworthiness of the Remotely Piloted Aircraft (RPA);
      refer to a data type prioritization scheme to assign a priority to each of the plurality of different data types, including assigning the telemetry data a first priority and assigning the radio communication data a second priority, the first priority higher than the second priority;
      monitor a link quality for each of the plurality of communication devices;
      select a subset of communication devices, from among the plurality of communication devices, for transferring the accessed data based on the monitored link qualities and assigned priorities, the subset of communication devices selected by balancing operating costs for one or more of the plurality of communication devices against having sufficient capability to reliably transfer the accessed data; and
      route the accessed data through the bonded communication link in accordance with a data distribution scheme based on the assigned priority for each of the plurality of different data types and the monitored link qualities, including:
         route the telemetry data through one or more communication devices, from among the selected subset of communication devices, with higher link quality;
         route the radio communication data through one or more other communication devices, from among the selected subset of communication devices, the one or more other communication devices having degraded link quality relative to the higher link quality; and
         refrain from routing accessed data over any non-selected communication devices.

18. The Remotely Piloted Aircraft (RPA) of claim 17, wherein the one or more flight related components comprises a plurality of rotors used to control direction, speed, acceleration, pitch, yaw, and roll of the Remotely Piloted Aircraft (RPA).

19. A system comprising:
   a processor;
   system memory coupled to the processor and storing instructions configured to cause the processor to:
      access data associated with one or more components co-located at a remotely operated aerial vehicle;
      identify a plurality of different data types included in the accessed data, the plurality of different data types including radio communication data;
      refer to a data type prioritization scheme to assign a priority to each of the plurality of different data types including the radio communication data and another type of data;
      monitor a link quality for each of a plurality of communication devices;
      select a subset of communication devices, from among the plurality of communication devices, for transferring the accessed data based on the monitored link qualities and assigned priorities, the subset of communication devices selected by balancing operating costs for one or more of the plurality of communication devices against having sufficient capability to reliably transfer the accessed data; and
      route the accessed data through the bonded communication link in accordance with a data distribution scheme based on the assigned priority for each of the plurality of different data types, including the radio communication data, and the monitored link qualities, including:
         route the radio communication data over a first communication device included in the subset of communication devices;

route the other type of data over a second communication device included in the subset of communication devices; and refrain from routing accessed data over any non-selected communication devices.

20. The system of claim 19, wherein instructions configured to cause the processor to access data associated with one or more components co-located at a remotely operated aerial vehicle comprise instructions configured to cause the processor to accessing at least one of: power data, engine data, and environmental data associated with operation of the remotely operated aerial vehicle.

* * * * *